Aug. 29, 1939.　　G. M. KRIEGBAUM ET AL　　2,171,034
TRACTOR ATTACHED IMPLEMENT
Filed Sept. 4, 1936　　3 Sheets-Sheet 1
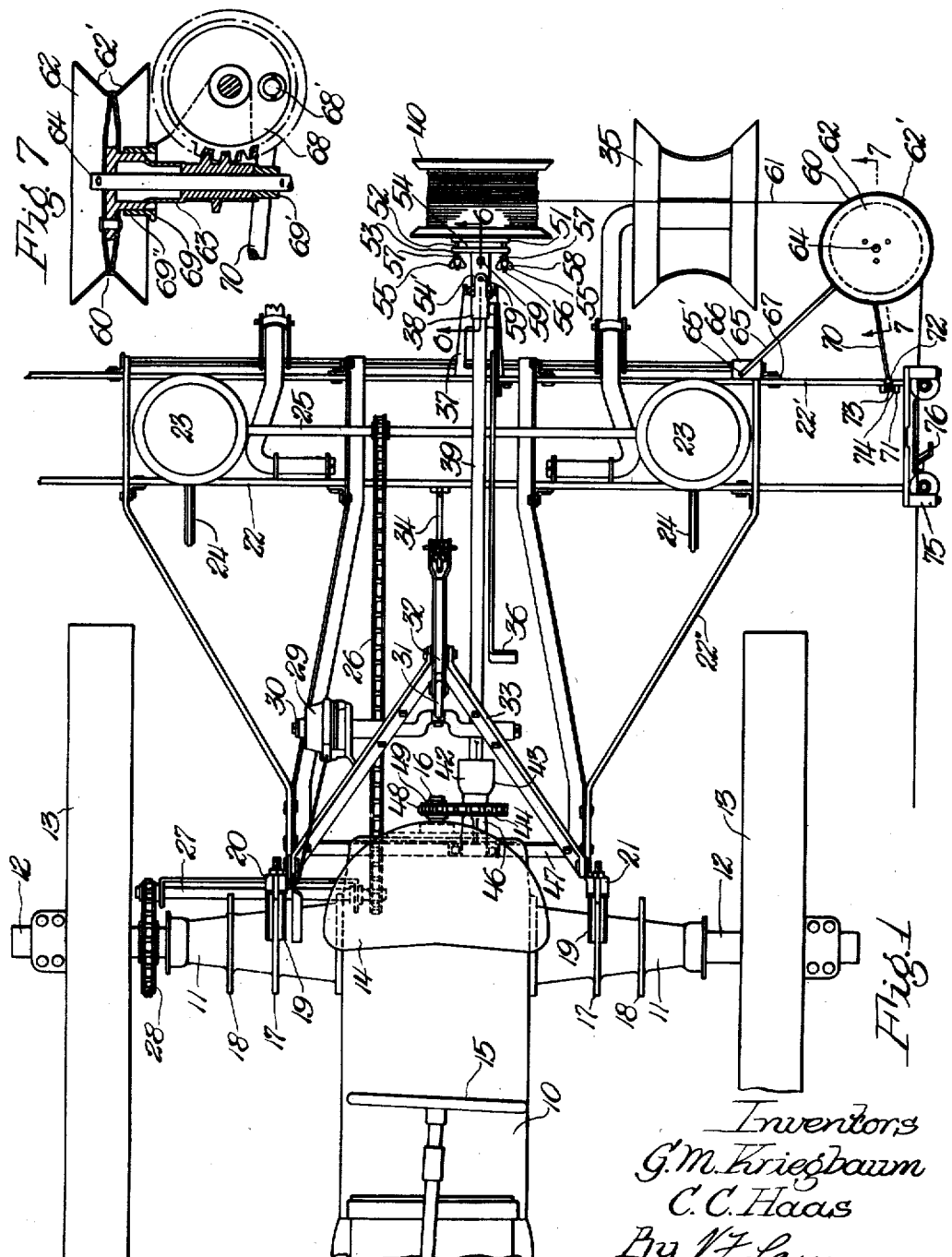

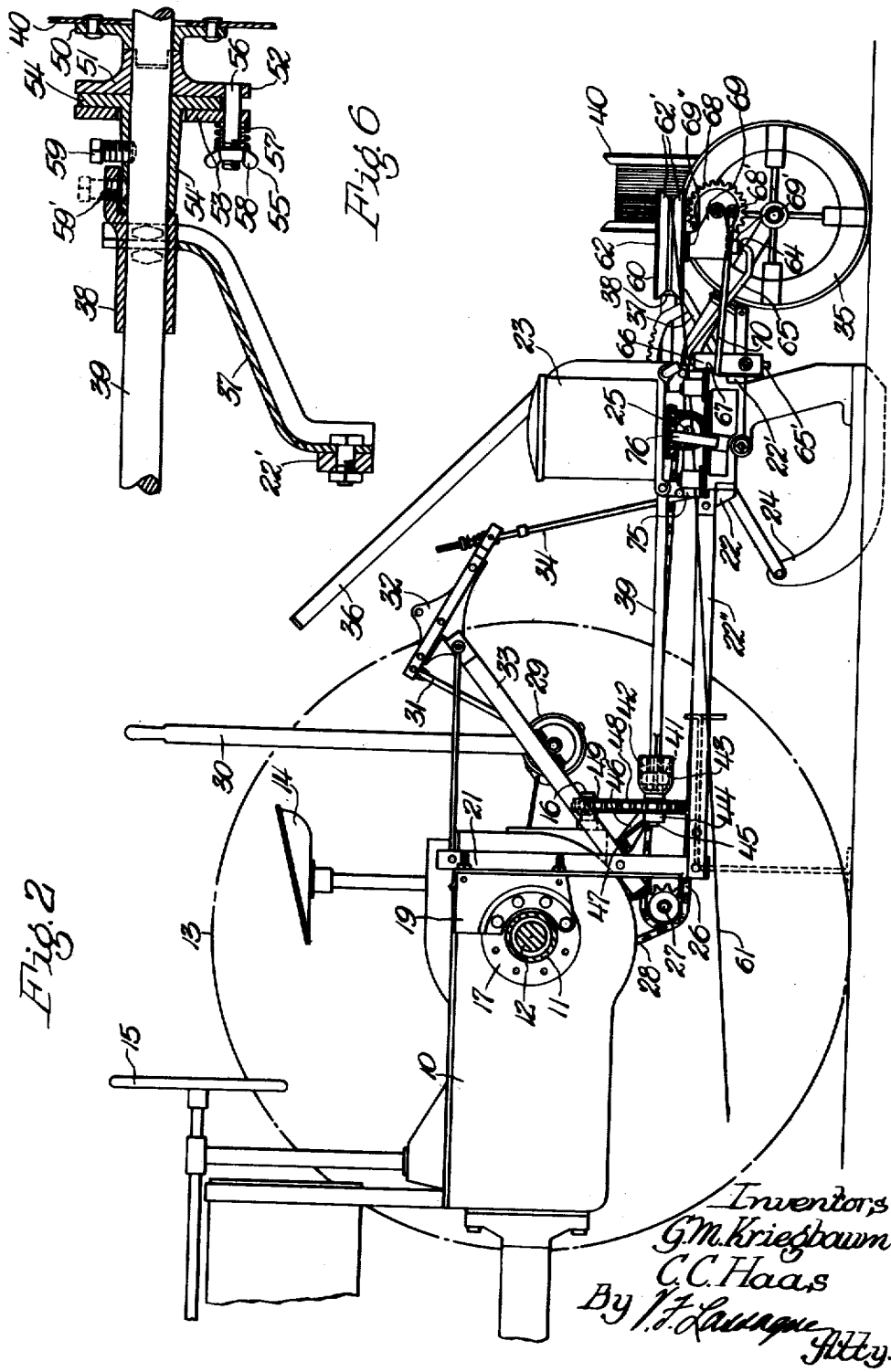

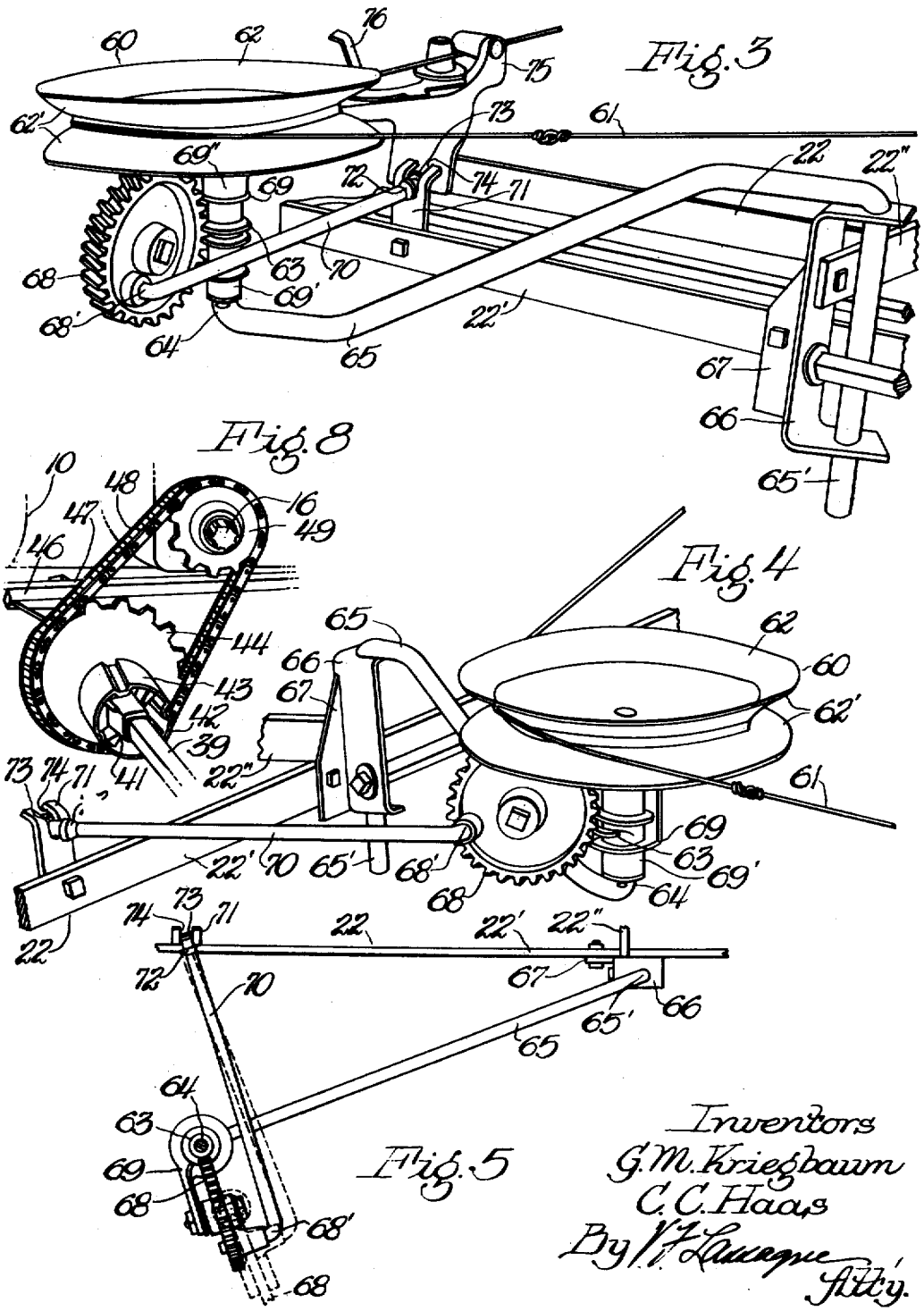

Patented Aug. 29, 1939

2,171,034

UNITED STATES PATENT OFFICE 2,171,034

TRACTOR ATTACHED IMPLEMENT

George M. Kriegbaum and Clarence C. Haas, Richmond, Ind., assignors to International Harvester Company, a corporation of New Jersey Application September 4, 1936, Serial No. 99,358

20 Claims. (Cl. 111—44)

This invention relates to planters and, more particularly, to check wire reeling mechanism carried on a direct connected tractor corn planter in which the corn planter and its mechanism is wholly supported from the tractor.

The main object of the invention is to provide power actuated reeling and level winding mechanism for a planter and to mount a direct connected corn planter on a tractor so that the entire weight of the planter structure and reeling mechanism, when transported, will be carried by the tractor.

Another object of the invention is to connect the covering wheels of the planter which also serve as gauge wheels so that they will support part of the weight of the planter when the operator begins to raise the planter into transport position.

Another object of the invention is to provide the planter attachment with quick attachable features so that it may be readily attached to and detached from the tractor.

Another object of the invention is to provide lifting means whereby the planter may be easily raised and lowered from ground engaging position to transport position.

Another object is to position the reeling mechanism on the planter attachment in order to balance the load of the wire on the planter attachment when transporting and also to have a direct drive shaft for the reeling mechanism.

Another object is to position the sheave mechanism for the wire reeling mechanism in order to let out the wire close to a fence row and to keep the wire outside of the tractor wheel when reeling up with the reel in the center of the planter and at the same time provide means for guiding the wire on the reel so that the wire will be wound up level.

The main subject matter of this invention accordingly resides in the means for reeling and unreeling of the planter check wire and consists, mainly, in providing a centrally mounted reeling and unreeling mechanism for a planter reeling mechanism operated from the power take-off of the tractor, including means for the level winding of the check wire on the wire reel, which check wire reeling device tends to take up the wire faster than the ground travel of the tractor attached planter causing a friction clutch to slip and maintain a constant tension on the wire. There is also provided a clutch means in the reeling mechanism to maintain correct tension on the check wire in reeling and unreeling.

Other objects and advantages will appear in the following description of the preferred embodiment of the invention as illustrated in the accompanying drawings wherein:

Figure 1 is a plan view of the rear portion of a tractor having the novel planter construction mounted thereon and showing the check wire reeling and unreeling mechanism mounted on the planter;

Figure 2 is a side view of the rear portion of the planter attachment and reel winding and unwinding mechanism shown in Figure 1;

Figure 3 is an enlarged view of the level winding mechanism for the check wire mechanism in position for reeling up the check wire;

Figure 4 is an enlarged view of the level winding mechanism for the reeling and unreeling mechanism for the check wire showing the level winding mechanism in position for the unreeling of the check wire;

Figure 5 is an enlarged plan view partly in section of the level winding mechanism in its reeling position;

Figure 6 is a sectional view along line 6—6 of Figure 1 showing the friction clutch for the check wire reel drive mechanism showing the position of the locking means for the friction clutch in reeling and unreeling position;

Figure 7 is an enlarged sectional view taken along line 7—7 of Figure 1 showing the details of the drive mechanism of the level winding mechanism; and, Figure 8 is a perspective view showing the spider gear on the reel drive shaft and the reel drive sleeve.

In the construction illustrated a tractor of a well-known tricycle type has an oblong casing 10 forming the rear end of the tractor body and containing the transmission and differential mechanism. The rear portion of this casing has bolted or otherwise secured to it, on each side aligned tubular axle housings 11 containing the bearings for axle shafts 12 which extend beyond the ends of the housing. Tractor wheels 13 are adjustably secured to the axle ends. The casing 10 supports a centrally located driver's seat 14 in convenient relation to the usual steering wheel 15 and other controls not shown. The casing 10 has suitable bearings for a central power take-off shaft 16 which projects from the rear wall thereof and is driven through suitable gearing within the casing. By means of the power take-off shaft or connection closely coupled implements requiring power may be driven therefrom, as in this instance a power driven check wire reel winding mechanism. Cast integrally on the axle housing 11 are inner and outer flanges 17 and 18. Secured to the inner flanges 17 are coupling members 19 to which the quick detachable planter is attached. The coupling members 19 are disclosed and claimed in assignee's copending application of Carl W. Mott, Serial No. 29,938 filed July 5, 1935.

In the present invention the supporting structure for the direct connected tractor planter consists of two downwardly extending right and left hand members 20 and 21, respectively, connected to the coupling members 19 by the usual quick detachable coupling means, as disclosed in the previously mentioned copending application of Carl W. Mott.

As the planter attachment and its lifting mechanism is disclosed and claimed in our copending application, Serial No. 99,359 filed Dec. 5, 1935, only as much of the frame structure of the planter and the lifting mechanism will be described here as is necessary to enable one to understand the operation of the planter. Attached to the supporting members 20 and 21 is a planter frame construction 22 comprising the transverse frame construction and the forwardly mounted draft connections. Mounted on the transverse frame construction of the planter are the usual hoppers 23 and furrow openers 24. The driving mechanisms for the planters are also mounted on the transverse frame construction and the planter mechanism is driven by the transverse drive shaft 25, which is in turn driven by a flexible chain 26 driven from a countershaft 27. The countershaft 27 is driven by a chain drive 28 from the rear axle 12.

The planter frame construction 22 mounted for vertical movement about a horizontal axis is raised and lowered by a ratchet lift mechanism 29 actuated by a lifting and lowering lever 30 extending within reach of the operator's station 14. As the lever 30 is ratcheted, the ratchet lift mechanism 29 with its attaching parts 31 and 32 mounted on the rearwardly extending boom construction 33 for supporting the planter frame 22 in raised or transport position is actuated. The boom construction 33 is supported from the members 20 and 21. A link 34 connects the planter frame 22 to the reciprocatory, or oscillatory, member 32.

The covering wheels or gauge wheels 35 for controlling the depth of the planter in planting position are supported from the planter frame 22 and are raised and lowered by the lifting lever 36 extending to within reach of the operator's station 14. It is, therefore, obvious that a simple and novel direct connected planter construction has been disclosed in which the planter attachment may be supported from the tractor in transport position and readily raised and lowered by the actuation of the lifting lever 30. The planter mechanism as described is driven from the forward travel of the tractor and may be so connected as to be drawn into and out of operation upon the raising and lowering of the planter frame from transport to ground engaging position.

The novel check wire reeling and unreeling mechanism which is the main object of the invention is best shown in Figures 1, 3, 4, 5, and 6. Centrally positioned on the transverse planter frame 22 is a rearwardly extending supporting bracket 37 which forms means for removably supporting said check-wire reeling mechanism, as best shown in Figures 1 and 6. At the upper end of the bracket 37 is mounted a self-aligning bearing 38 in which is journaled a longitudinall extending drive shaft 39 for a centrally positioned check wire reel 40 or check-wire reeling means with the axis of the reels extending longitudinally with respect to the planter. The longitudinally extending drive shaft 39 has at its forward end a flexible coupling member or spider gear 41 forming, with a female coupling member or reel drive sleeve 42, a universal joint 43. The universal joint 43 is formed integrally with a sprocket 44 and forms flexible driving means for driving said check-wire reel. The sprocket 44 is mounted on a stub shaft 45 which is supported by a chain tightener bracket 46. The bracket 46 is mounted on a transverse support 47. The transverse support 47 is mounted on the boom supporting structure at its lower end. The bracket 46 with the stub shaft 45 forms a chain tightener bracket and may be used to adjust the tension of a chain 48 forming chain drive means for driving said check-wire reeling mechanism driven by a sprocket 49 mounted on the power take-off shaft 16. The aforesaid sprockets 44 and 49 and chain 48 form speed reducing means driven from said power take-off connection for driving said flexible driving means. The universal joint 43, sprockets 44 and 49, and the chain 48 form a simple means by which the longitudinal shaft 39 may be driven proportional to the speed of the power take-off of the tractor. This universal joint and sprocket permit also a simple form of chain tightening means for the drive chain 48 and at the same time the universal joint 43 permits the shaft 39 to be correctly aligned when the planter attachment is in its ground engaging position and at the same time provides a flexible connection for the shaft 39 when the planter attachment is raised in transport position.

The reel 40 is formed in the usual manner and is mounted on and supported by the rear end of the longitudinal drive shaft 39. The reel 40 is free to rotate on the shaft 39. The reel 40 has a clutch engaging member 50 which engages with a complementary friction plate member 51 of a friction clutch 52. The friction clutch means 52 comprises the clutch plates 51 and 53, as best shown in section in Figure 6. The clutch plate 53 is free to rotate about an inner friction clutch plate 54. The clutch plates 51 and 53 are held in frictional engagement with the inner plate 54 by means of a tension adjusting means 55. The tension adjusting means 55 comprises a stud 56 attached to the plate 51 and mounted outside of the diameter of the inner plate 54. The stud 56 passes through a hole in the plate 53 and has mounted thereon a compression spring 57 and wing adjusting nuts 58. By adjusting the wing nuts 58, the friction between the plates may be increased or decreased at will. As shown in Figure 6, the inner clutch plate 54 may be clamped to the drive shaft by a set screw 59 extending through a collar portion 54' of the friction plate 54 and engaging the longitudinal drive shaft 39. When the set screw is in the position shown in the solid lines, the mechanism of the reeling device is so connected that, upon the operation of the longitudinal shaft 39, the reel will be actuated and the check wire wound upon the reel. As the set screw firmly engages the shaft 39 the friction plate is driven by the shaft 39. The set screw 59 in its various positions forms locking means. As the friction clutch members 51 and 53 engage the inner friction clutch member 54, the reel which is attached to the member 51 by the clutch engaging members in the form of complementary engaging parts will cause the reel to be driven. When the set screw is placed in the position 59' the reeling mechanism is in position for the unreeling of the check wire from the planter. With the set screw 59 in its position 59', the inner clutch member 54 is held rigid by means of the support 37 and the self-aligning bearing 38. As the reel 40 is free to rotate on the shaft 39, the clutch member 51 which is attached thereto will rotate with the reel 40, and, as the members 51 and 53 of the clutch member 52 are in frictional engagement with the member 54 which is held stationary by the set screw 59', a drag will be placed upon the check wire so that the check wire will always be under a uniform tension to prevent snagging of the check wire in unreeling. Similarly, in reeling up the check wire, as the speed of the drive shaft is such that the reel tends to take up the wire faster than the ground travel the friction clutch is caused to slip; and, therefore, a constant tension is maintained on the check wire. The aforementioned construction forms means for placing the check-wire under tension whereby said check wire will be laid out uniformly.

As the check wire reel 40 is placed practically in the center of the planter, the load of the check wire which generally is very great is balanced so that the planter frame 22 is not unbalanced in transport position.

Figures 3, 4, 5, and 7 show the level winding mechanism for the check wire reeling mechanism. Figure 3 shows the level winding mechanism in its reeling position and Figure 4 shows the level winding mechanism in its unreeling position. The level winding means or mechanism 60 has a reciprocatory, or oscillatory, motion longitudinally with respect to the travel of the planter mechanism, in order that the check wire 61 may be wound level upon the check-wire reel 40. A check wire sheave 62, or means for guiding said check-wire, as best shown in Figure 7, forms a laterally positioned means mounted on said corn planter for guiding said check wire from said check wire reeling means and is formed from two dish-shaped, stamped steel parts 62'. These are riveted to a cast worm member 63 which is journaled on an upright spindle 64 of an oscillating, or reciprocatory, supporting member 65. The oscillatory, or reciprocatory, member 65 is journaled in the supporting bracket 66. The supporting bracket 66 is U-shaped in form and has a downwardly extending portion 65' of the member 65 journaled in the legs of the D-shaped member 66. The member 66 is supported on a rear frame bar 22' by a bracket 67. The members 65 and 70 and associated parts form means for positioning and supporting said level winding mechanism 60. The bracket 67, in turn, is braced by a brace member 22'' of the planter frame 22 forming a supporting frame for said level winding mechanism. Mounted on the spindle 64 for supporting a worm wheel 68 is a bracket 69, as best shown in Figures 4, 5, and 7. The bracket 69 has a lower portion 69' journaled on the spindle 64 which acts to take the thrust of the worm 63. The upper portion 69'' of the bracket 69, as best shown in Figure 7, has the worm 63 journaled therein. Attaching the worm wheel 68 to the rear frame member 22' is a pitman member 70. The member 70 is pivotally mounted on the worm wheel 68 eccentric to the axis of the worm wheel 68, thereby forming a crank portion as at 68'. The forward end of the pitman member 70 is flexibly connected by a fork shaped bracket 71 mounted on the frame member 22'. The member 70 has at its forward end, spaced collar portions 72 and 73 which are so positioned that they fit a notch 74 in the bracket 71. The worm wheel 68 and worm 63 are mounted so that the plane of the worm wheel lies in the plane of the axis of the worm. The member 65, the worm wheel 68, the pitman 70, and the support or frame connection between the bracket 71, and the bracket 67 form a triangle of which the apex is adjustable the amount of the throw of the crank formed by the connection of the worm wheel to the pitman 70. As the sheave is rotated by the reeling of the check wire 61 passing over the sheave, the sheave, as it is connected to the worm 63, in turn rotates the worm wheel 68, and as the worm wheel 68 is rotated, the apex of the triangular portions of the level winding mechanism changes so that, as the check wire is reeled on to the reel 40, the check wire is reeled evenly thereon. The motion of the sheave or level winding mechanism, as it is reciprocated or oscillated, is such as to distribute the check wire evenly across the face of the check wire reel, as best shown in Figure 1. The motion in reeling taken by the parts is shown in Figure 5. As shown in Figure 3, the level winding mechanism in reeling is in its innermost position next to the planter frame 22. With the crank in its opposite position to that shown, the level winding mechanism would be away from the planter frame 22 at its maximum distance. As best shown in Figures 1 and 3, when the planter is used in reeling in the check wire 61, the check wire extends about the rearmost portion of the sheave 62 though the doffing mechanism 75 of the check head. As the planter is driven forwardly for reeling, the planter is in ground engaging position but with depth lever adjusted to raise the furrow openers as much as possible. The check fork 76 has been thrown out of engagement so that the planter mechanism is not operating.

In reeling up the wire the procedure is to insert the spindle gear 41 on the reel shaft 39 in the drive sleeve 42 and place the reel shaft bearing 38 in the forked portion of the bracket 37. Next, place the set screw 59 in the rear hole in the rear drive wheel, or friction plate 54. The reel should be put on so that the wire will be reeled over the top of the reel. The sheave 62 should be used on the left hand side of the planter only in reeling up the wire and with the pitman as shown in Figure 3. The planter is then lowered. The wire 61 provided it comes on the left hand side of the planter, when the planting is about to be finished, may be reeled up at the same time that the last two rows are planted. In this case, the check wire should be threaded through both the check head 75 and check fork 76 and there should be enough tension on the friction clutch 52 to keep the wire taut. If the wire is being reeled up after all the rows have been planted, the check wire should be threaded through the check head 75 only and then around the rear side of the sheaves 62 and on to the top of the reel. Enough tension should be placed on the friction clutch 52 by tightening the wing nuts 58 so that the wire will be wound tight on the reel 40. The tractor power take-off shaft 16 is then thrown into gear by means of a lever on the tractor, not shown, and the tractor is then driven slowly in high gear with the engine throttled down. The wire will then be automatically wound evenly on the reel. In transporting the reel of wire to and from the field, it is always best to remove the reel of wire from the planter and carry it on the tractor, although it is not absolutely necessary.

In laying out the check wire, the level winding mechanism is placed as shown in Figure 4. This is done by removing the pitman from the bracket 71 and turning the bracket 69 with the worm wheel 68 thereon in the position shown in Figure 4, and replacing the pitman 70 in the bracket 71. In this position the sheave 62 is so positioned that the portion of the sheave about which the wire 61 is placed lies approximately in the center of the reel 40, a position which would correspond to that shown in Figure 1 for reeling in the check wire. The spider gear 41 on the reel shaft is inserted in the drive sleeve 43 and the reel shaft bearing 38 is placed in the forked portion of the bracket 37, as previously described, in reeling up the check wire. However, the set screw 59 is placed in an ear on the bearing 38, as shown in the dotted position 59' of the set screw in Figure 6. The set screw 59 is threaded through the ear and well into the forward hole in the end of the reel hub 54'. The reel of wire should be placed on the shaft 39 so that the wire will be unreeled from the top. The reel is held in place by a set collar (not shown) on the outer end of the shaft 39. The level winding mechanism 60 may be positioned on either side of the planter for unreeling only. Similar brackets 71 and 66 are positioned on the opposite side of the planter to those shown in Figure 1 for supporting the level winding mechanism on the right hand side of the planter frame. This construction has not been shown in Figure 1, as the construction is similar to that described for the left hand side of the planter. The planter is lowered and the wire is pulled from the reel 40 and passed around the forward side of the sheave 62 as shown in Figure 4. The wing nuts 58 on the friction cutch 52 are tightened only enough to keep the reel from running too fast. In laying out the wire the reel 40 rotates on the shaft 39, the shaft 39 not being driven by the tractor power take-off. As the wire is unwound from the reel, the level winding mechanism 60 has a back and forth movement across the surface of the reel 40 similar to the movement of the level winding mechanism when positioned, as shown in Figure 3, for reeling up the check wire 61. This back and forth movement of the level winding mechanism permits the wire to be unwound from the reel in the same manner as it was wound upon the reel.

In both the reeling and unreeling operations, as shown in Figures 3 and 4, the side from which the check wire is wound about the sheave 62 is so positioned that this side of the sheave will approximately line up with the center of the reel; that is, as shown in Figure 1 in the reeling position, the check wire is placed about the reel side of the sheave with the parts of the level winding mechanism positioned as shown in Figure 3. In unreeling the wire, the level winding mechanism is positioned as shown in Figure 4 with the wire placed about the forward side of the sheave so that the side of the sheave will approximately line up with the center of the reel.

It is obvious that a simple check wire reeling mechanism has been invented in which the check wire is uniformly reeled on the check wire reel and unreeled therefrom. Also a novel level winding mechanism has been provided for a check wire reeling or other suitable wire reeling apparatus. In addition, the level winding apparatus has been so designed that it may be used on either side of the planter frame for reeling or unreeling of the check-wire.

The preferred embodiment of the invention is capable of certain modifications without departure from the scope of the invention to be defined in the following claims.

What is claimed is:

1. The combination with a planter of the check-wire type having a laterally positioned check-head, of a centrally positioned check-wire reeling means on said planter, and a level-winding means for said check-wire reeling means mounted on said planter and positioned rearwardly with respect to the aforesaid check-head and laterally with respect to said check-wire reeling means.

2. The combination with a planter of the check-wire type having a laterally positioned check-head, of a centrally positioned check-wire reeling means, comprising a reel mounted with the axis thereof extending longitudinally of the planter, means for guiding said check-wire from said check-head to said check-wire reeling means mounted on said planter, and means for operating said check-wire reeling means whereby said check-wire will be reeled on the aforesaid check-wire reeling means.

3. The combination with a tractor having a power take-off connection, of a planter of the check-wire type directly connected to said tractor and mounted for vertical movement, a check-wire reeling mechanism mounted on said planter, said check-wire reeling mechanism comprising a check-wire reel mounted with the axis of the reel extending longitudinally with respect to the planter, flexible driving means for driving said check-wire reel whereby said check-wire reel may be actuated in all vertical positions of said planter, and means driven from said power take-off connection for driving said flexible driving means.

4. The combination with a tractor having a power take-off connection, of a planter of the check-wire type directly connected to said tractor and mounted for vertical movement about a horizontal axis, a check-wire reeling mechanism for said planter, said check-wire reeling mechanism comprising a longitudinal drive shaft, and means for driving said check-wire reeling mechanism from the aforesaid power take-off connection.

5. The combination with a tractor having a power take-off connection, of a planter of the check-wire type directly connected to said tractor and mounted for vertical movement about a horizontal axis, a check-wire reeling mechanism for said planter, said check-wire reeling mechanism comprising a longitudinal drive shaft, and means for driving said longitudinal drive shaft comprising a flexible drive connection whereby said longitudinal drive shaft may be actuated in all positions of said planter.

6. The combination with a planter of the check-wire type, of a check-wire reeling mechanism mounted on said planter, said check-wire reeling mechanism comprising a check-wire reel, a drive shaft for said check-wire reel having the check-wire reel journaled thereon, means for supporting the check-wire reel mechanism on the planter, clutch means mounted on said drive shaft and adapted to drive said check-wire reel, said clutch means comprising a plurality of clutch plates, locking means in one position adapted to drive one of said plates of the clutch means from the drive shaft whereby the check-wire reel may be operated from said drive shaft for reeling, and said locking means in another position adapted to engage said supporting means for the check-wire reel mechanism and the aforementioned plates of the clutch means whereby the check-wire reel is free to rotate upon the drive shaft for unreeling of the check-wire.

7. The combination with a planter of the check-wire type, of a centrally positioned check-wire reeling mechanism for reeling and unreeling of a check-wire comprising a check-wire reel and a check-wire, means for driving said check-wire reeling mechanism, level winding means for said check-wire reeling mechanism mounted on said planter comprising a reciprocal guiding means for said check-wire, means adapted for positioning said guiding means whereby the center of reciprocation of the guiding means may be in one position laterally of the reel for the reeling up of said check-wire and in another position for the unreeling of said check-wire.

8. A level winding mechanism for a reeling mechanism, comprising a supporting frame, means comprising members pivotally mounted on said supporting frame and converging to form a support, guiding means supported by one of the aforesaid members and mounted for rotation, and means driven from said guiding means and connected to the other of said pivoted members whereby said guiding means will be oscillated.

9. A level winding mechanism for a reeling mechanism, comprising a guiding mechanism, a supporting frame therefor, means for shifting said guiding mechanism with respect to said supporting frame for adapting said guiding mechanism either to a reeling or an unreeling position with respect to the aforesaid reeling mechanism, and means for reciprocating said guiding mechanism whereby the position of said level winding mechanism is shifted first in one direction and then in another along the axis of the reeling mechanism for the level winding of said reeling mechanism.

10. A level winding mechanism for a reeling mechanism, comprising a supporting frame, a member pivotally mounted on said supporting frame, guiding means mounted for rotation on said pivotally mounted member, and means connected to the supporting frame and actuated by rotation of the guiding means whereby the guiding means is oscillated.

11. In a level winding mechanism as set forth in claim 10, said means actuated by rotation of the guiding means being enabled by virtue of its connection with the frame to position the guiding means in one position for reeling and in another position for unreeling.

12. The combination with a planter of the check-wire type, of a check-wire reeling mechanism mounted on said planter and a level winding mechanism for the aforesaid check-wire reeling mechanism comprising a guiding mechanism, means for actuating said guiding mechanism upon the operation of said check-wire reeling mechanism, a member pivotally mounted on said planter and forming a support in which the guiding mechanism may rotate, driven means, means for supporting said driven means, means for driving said driven means from said guiding means, and means for connecting said driven means to said planter whereby upon the rotation of said guiding means it will be reciprocated with respect to said planter and to said check-wire reeling mechanism.

13. In combination with a planter of the check-wire type, apparatus comprising a support, a drive shaft journaled in the support, a check-wire reel and clutch means in connection therewith, both mounted on the drive shaft, means for connecting the clutch means with the drive shaft for reeling up of the check-wire and means for connecting the clutch means with the support for unreeling of the check-wire.

14. In combination with a planter of the check-wire type, apparatus comprising a support, a drive shaft journaled in the support, a check-wire reel removably and rotatably mounted on the drive shaft, a clutch comprising three plates, the two outside plates being connected to one another and removably connected to the check wire reel, means for connecting the middle plate with the drive shaft for reeling up of the check-wire and means for connecting the middle plate with the support for unreeling.

15. In combination with a planter of the check-wire type, apparatus comprising a check-wire reel, means for rotating the reel, level winding means for said check-wire reel comprising a reciprocal guiding means for the check-wire, and means for positioning said guiding means longitudinally of the reel for reciprocation from one position for reeling up and from another position for unreeling.

16. In combination with a planter of the check-wire type, apparatus comprising a check-wire reel, means for rotating the heel, level winding means for said check-wire reel comprising a movable guiding means for the check-wire, and means for positioning said guiding means longitudinally of the reel for movement from one position for reeling up and from another position for unreeling.

17. In combination with a planter of the check-wire type, apparatus comprising a check-wire reel, means for rotating the reel, level winding means for said check-wire reel comprising a guiding means for the check-wire reciprocal in response to the movement of the check-wire over the guiding means, and means for positioning said guiding means longitudinally of the reel from one position for reeling up and from another position for unreeling.

18. A level winding mechanism for a reeling mechanism comprising a supporting frame, attaching means comprising members pivotally mounted on the frame and converging in a point spaced from the frame, a guiding means rotatably supported by one of said members, a rotatable connection between the members adjacent the guiding means and responsive to the rotation of the guiding means whereby an oscillation of the guiding means occurs with rotation thereof.

19. A level winding mechanism for a reeling mechanism comprising a supporting frame, members connected at spaced points to said frame and loosely to one another at a point spaced from the frame, guiding means rotatably supported on one of said members near the point of connection with the other member, and means forming the loose connection between the members and responsive to the rotation of the guiding means whereby the guide means is oscillated.

20. A winding mechanism which is adjustable longitudinally of a reel for level winding from one position for reeling up and from another position for unreeling, said mechanism comprising a support, a pair of members pivotally mounted on the support at spaced points, a worm and a sheave fixedly mounted on a shaft and rotatably supported by the shaft on one of the pair of members at a point spaced from its mounting on the support, a bracket rotatably mounted on the shaft, and a worm wheel rotatably mounted on the bracket and in mesh with the worm, the second of the pair of members being pivotally and eccentrically attached to the worm wheel.

GEORGE M. KRIEGBAUM.
CLARENCE C. HAAS.

CERTIFICATE OF CORRECTION.

Patent No. 2,171,034. August 29, 1939.

GEORGE M. KRIEGBAUM, ET AL.

It is hereby certified that error appears in the printed specification of the above numbered patent requiring correction as follows: Page 5, second column, line 34, claim 16, for the word "heel" read reel; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.

support, a pair of members pivotally mounted on the support at spaced points, a worm and a sheave fixedly mounted on a shaft and rotatably supported by the shaft on one of the pair of members at a point spaced from its mounting on the support, a bracket rotatably mounted on the shaft, and a worm wheel rotatably mounted on the bracket and in mesh with the worm, the second of the pair of members being pivotally and eccentrically attached to the worm wheel.

GEORGE M. KRIEGBAUM.
CLARENCE C. HAAS.

CERTIFICATE OF CORRECTION.

Patent No. 2,171,034.                                   August 29, 1939.

GEORGE M. KRIEGBAUM, ET AL.

It is hereby certified that error appears in the printed specification of the above numbered patent requiring correction as follows: Page 5, second column, line 34, claim 16, for the word "heel" read reel; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.